United States Patent

[11] 3,593,280

[72] Inventor Giampaolo Garcea, Milan, Italy
[21] Appl. No. 826,492
[22] Filed May 21, 1969
[45] Patented July 13, 1971
[73] Assignee Alfa Romeo S.p.A.
Via Gattamelata, Milan, Italy
[32] Priority July 3, 1968
[33] Italy
[31] 18548 A/68

[54] REGULATOR DEVICE BASED ON INSPECTION OF THE THICKNESS OF A THREE DIMENSIONAL CAM IN THE FORM OF A PLATE PARTICULARLY FOR FUEL FEED ADJUSTMENT IN INTERNAL COMBUSTION ENGINES
4 Claims, 2 Drawing Figs.

[52] U.S. Cl. .................................................. 338/150, 74/567, 235/197
[51] Int. Cl. ....................................................... H01c 15/00
[50] Field of Search ............................................ 338/150; 74/567, 569, 53, 54; 235/197; 33/149 I

[56] References Cited
UNITED STATES PATENTS
1,816,464  7/1931   Biggert .................. 33/149 (I)
2,442,630  6/1948   Wickesser ............. 338/150 X
2,962,911  12/1960  Perkey et al. .......... 74/567 X
3,160,744  12/1964  Weiss .................... 235/197

Primary Examiner—Laramie E. Askin
Assistant Examiner—D. A. Tone
Attorney—Holman and Stern ABSTRACT: A regulator device in which two arms are resiliently urged on two opposite faces of a cam body, rotatable around its axis, and having variable thickness, whereby a rotation of said cam body causes a relative movement of said two arms and then a regulating effect acting on a control member.

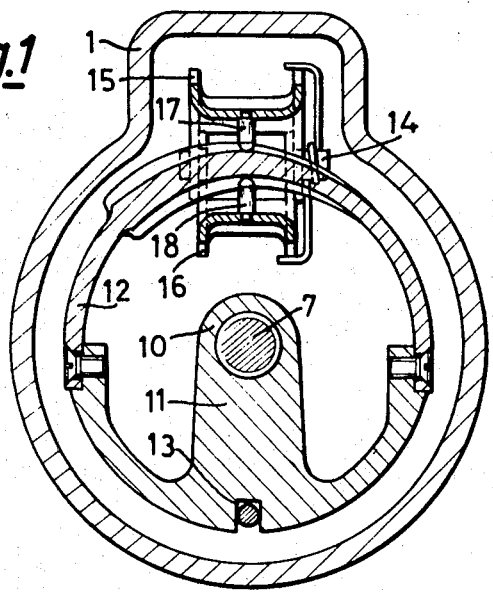
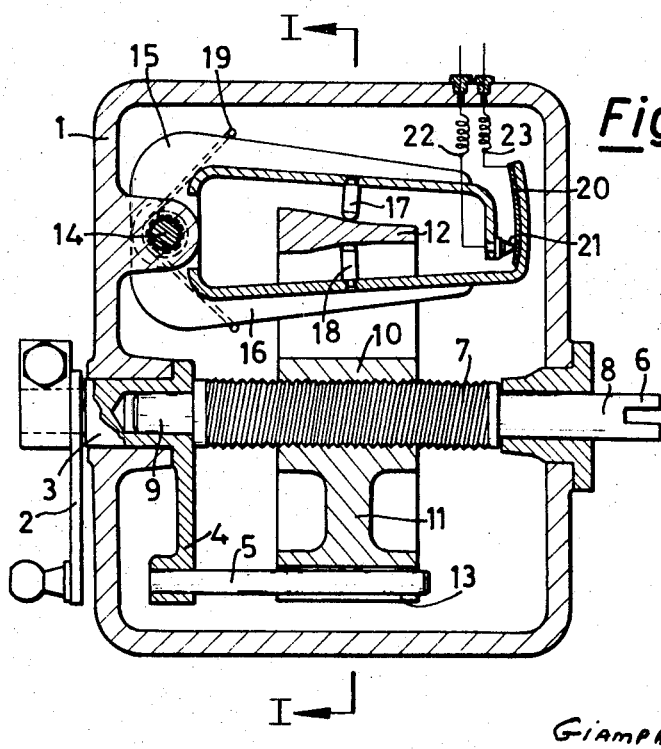

REGULATOR DEVICE BASED ON INSPECTION OF THE THICKNESS OF A THREE DIMENSIONAL CAM IN THE FORM OF A PLATE PARTICULARLY FOR FUEL FEED ADJUSTMENT IN INTERNAL COMBUSTION ENGINES

BACKGROUND OF THE INVENTION

The necessity often arises in practice for a regulator device in which the quantity C must be automatically furnished as a function of two other variable physical quantities A and B. In addition, the two physical quantities A and B are often independent one of the other and the physical quantity C cannot be mathematically expressed as a function of the quantities A and B. In the case of internal combustion engines, the quantities A and B can correspond, for example, to the rotational speed of the motor and the angular opening of the carburetor throttle respectively.

Regulators are known which, in such a case, automatically furnish the value of the physical quantity C, these being based upon the utilization of a three dimensional cam which performs movements with respect to a tracer which are proportional to the quantities A and B, while the tracer furnishes the physical quantity for regulation C in the form of movements in a direction normal to that of the two previously mentioned movements as a function of the dimensions of the three dimensional cam in the direction normal to that of the movements which it undergoes due to variations in the quantities A and B.

Obviously, the movements of the tracer and hence the cam lifts must be of much lesser dimensions than the movements effected as a function of the variations in the two quantities A and B, and hence the two dimensions of the cam normal to the movements of the tracer. Excessive gradients must be avoided which would otherwise cause sudden halting of the tracer or cause excessive forces to be required for movements corresponding to variations in the two quantities A and B. Taking this into account, the techniques required for the formation of the spacial profile of the cam, especially for mass production, must be very accurate because the manufacturing tolerances of the lifts are translated into proportional errors of adjustment.

In mass production, it is obvious that the manufacture of said surfaces with machine tools must be excluded, especially in the case of fairly complex spacial surfaces, mainly because of the slowness of the process and its cost. The cam would have to be cast by the process of microfusion or obtained by pressing, coining etc., so as not to require successive mechanical machining. In pieces of this type, the dimensional errors are mainly due to shrinkages of thermal, elastic or other character, and the absolute value of shrinkage is generally proportional to the dimension of the piece in the direction in which it is measured. Still greater errors can manifest themselves in the case where the piece has a shape which permits distortion and deflection because of the effect of said shrinkages.

In connection with the small dimensions of the lifts, the errors due to imperfections and slackness both at the cam and tracer constraints, to the slackness of such constraints themselves, and in addition errors of relative positioning of the constraints one to the other and with respect to the device controlled by the tracer must be added to the above-mentioned dimensional errors of the cam. The importance of this error, like that of the dimensional errors of the cam, can also be so great as not to permit an economical and reliable mass production.

SUMMARY OF THE INVENTION

With the object of minimizing the above errors, the device which forms the object of this invention, of the above-mentioned type comprises a projecting cam subjected to movements which are a function of the quantities A and B, provides for the utilization of a three dimensional cam in the form of a plate of variable thickness inserted between the pints of contact of two tracers coupled together by virtue of a common fulcrum similar to the two arms of a pair of pliers. The relative movement between one arm and the other when the plate slides between the two points is, in this way, determined only by the variation of thickness of the plate. Consequently, on the one hand, the tolerances between the actual thicknesses of the plate and the ideal thicknesses are minimized because of the technological reasons mentioned above, and on the other hand, neither the slackness of the coupling of the two arms with the fulcrum and the slackness between them, given the presence of a spring which always overcomes such slackness, nor the possible small errors of dislocation in space of the cam with respect to the fulcrum of the two tracers, influence the relative movement mentioned above. The variable angle formed between the two tracers constitutes the quantity for regulation C of the regulator. This can be sensed for utilization, for example, in the form of a variable electrical resistance if the electrical resistance is fixed at the end of one of the two arms and a contact is fixed at the end of the other arm which, by sliding over said resistance, defines the working length of the section, being inserted into the appropriate electrical circuit. In this way, the resistance relative to said working section constitutes the quantity C for regulation.

For greater clarity one embodiment is illustrated by way of example in the accompanying drawing in which:

BRIEF DESCRIPTION OF THE DRAWINGS

FIG. 1 shows a section of the device through the line I–I of FIG. 2 and the view looking in the direction of the arrows;

FIG. 2 shows an axial section through the device.

DETAILED DESCRIPTION OF THE INVENTION

These figures show two sections one normal to the other through a regulator device enclosed in a box 1. The information relative to one of the two variable physical quantities, for example the quantity A, is furnished to the device in the form of an angular position, this being angle $\alpha$ starting from an initial position of a lever 2 which projects outside the box 1. A second lever 4 is rigidly attached inside the box to a hub 3 of the lever 2, pivoted in the wall of the box, and thus carries out internally the same movements which the lever 2 carries out outside the box. A rod 5 whose axis is parallel to the axis of the hub 3 is rigid with the end of the lever 4. The information relative to the second of the two variable physical quantities, for example the quantity B, is furnished to the device in the form of an angular position, this being the angle $\beta$ starting from an initial position of an external end 6 of the shaft 7, whose axis coincides with the axis of the hub 3 of the lever 2. The shaft 7 has a fulcrum at its end 8 in the wall of a box and at 9 in a hole in the hub 3 of the lever 2. A hub 10, bored and threaded, is engaged with the central threaded part of a shaft 7, and has the plate chamber 12 rigidly fixed thereto by means of a spoke 11, with this plate of variable thickness being wound as a cylinder with its axis coinciding with the axis of the hub 10 and hence of the shaft 7. A groove 13 in which the rod 5 rigid with the lever 4 as mentioned above is engaged is formed in the external part of the spoke 11. In connection with the mechanism now described, variations in the physical quantity A and hence angular rotations of the lever 2 cause identical rotations of the plate 12 around its axis.

They also cause translation along the axis itself, with the translation in this context being ignorable. Variations in the physical quantity B, and hence rotation of the shaft 7, cause translation of the plate 12 along its axis because of the fact that the shaft 7 can only rotate and not move axially due to the existence of appropriate stops, while the plate 12 is hindered from rotating around its axis on account of the rod 5 being engaged in the groove 13. In the upper part of the box 1, the ends of a transversal fulcrum 14 are rigid with, an walls of the box. Inside the box the upper lever 15 and a lower lever 16, to which the tracers 17 and 18 are rigidly secured, are pivoted on said fulcrum. These tracers are maintained in contact with the external surface and the internal surface of the plate 12 respectively by the effect of a suitably preloaded needle spring 19.

An electrical resistance 20 is fixed to the end of the lever 16. A contact 21 which can slide over said electrical resistance 20 is fixed to the end of lever 15. Two flexible electric wires 22 and 23 permit insertion of the working section of the electrical resistance 20 determined by the relative position of the contact 21 on the resistance into an external electrical circuit. Said relative position is obviously determined by the thickness of the cylindrical plate at the point of contact with the two tracers. The thickness of the plate, which varies from one point to another in the zone explorable by the tracers, permits the device to furnish the values of the quantity for regulation C as a function of the two variable physical quantities A and B in the form of electrical resistance.

The device described above finds particular application in the adjustment of internal combustion engines, but can obviously find application in other fields.

What we claim is:

1. A device capable of furnishing a movement proportional to a quantity which is a function of two variables, comprising a cam having two opposing faces provided with a predetermined contour, said cam being mounted for displacements along two mutually perpendicular directions, two tracer members movable in the direction of the proportional movement, means maintaining said tracer members in contact with the two opposing faces of the cam, movements of said cam being possible relative to the two tracers, said relative movements each being a function of one of the above-mentioned variables, the dimension of said cam in the direction of the proportional movement being variable because of which the movement of one of said tracers with respect to the other is a function of both said variables.

2. A device capable of furnishing a movement proportional to a quantity which is a function of two variables, comprising two tracer members movable in the direction of the proportional movement and maintained in contact with the two opposing faces of a third member, movements of said third member being possible relative to the two faces in two different directions normal to said proportional movement, said relative movements each being a function of one of the above-mentioned variables, the dimension of said third member in the direction of the proportional movement being variable because of which the movement of one of said tracers with respect to the other is a function of both said variables, said third member including a cam which rotates and translates axially, whose angle of rotation is a function of one of said variables and whose translation is a function of the other of said variables, in which said cam is in the form of a sector of a cylindrical shell of variable thickness, on whose two faces the tracers rest secured respectively to two members which are movable one relative to the other, because of which the movement of one of said members relative to the other is proportional to said quantity.

3. The device as claimed in claim 1 in which two elements of an electrical circuit whose characteristics depend upon the position of one of said elements relative to the other are secured to said tracers.

4. The device as claimed in claim 2, in which said cylindrical cam is supported by a threaded pivot screwed into it and controlled so that it rotates as a function of one of said variables and controlled so that it is rotated angularly around said pivot by a member which moves as a function of the other of said variables.